Nov. 10, 1942.     R. G. DYKEMAN ET AL     2,301,665
VISCOSITY-CONTROLLED REGULATOR
Filed May 19, 1938     2 Sheets—Sheet 1
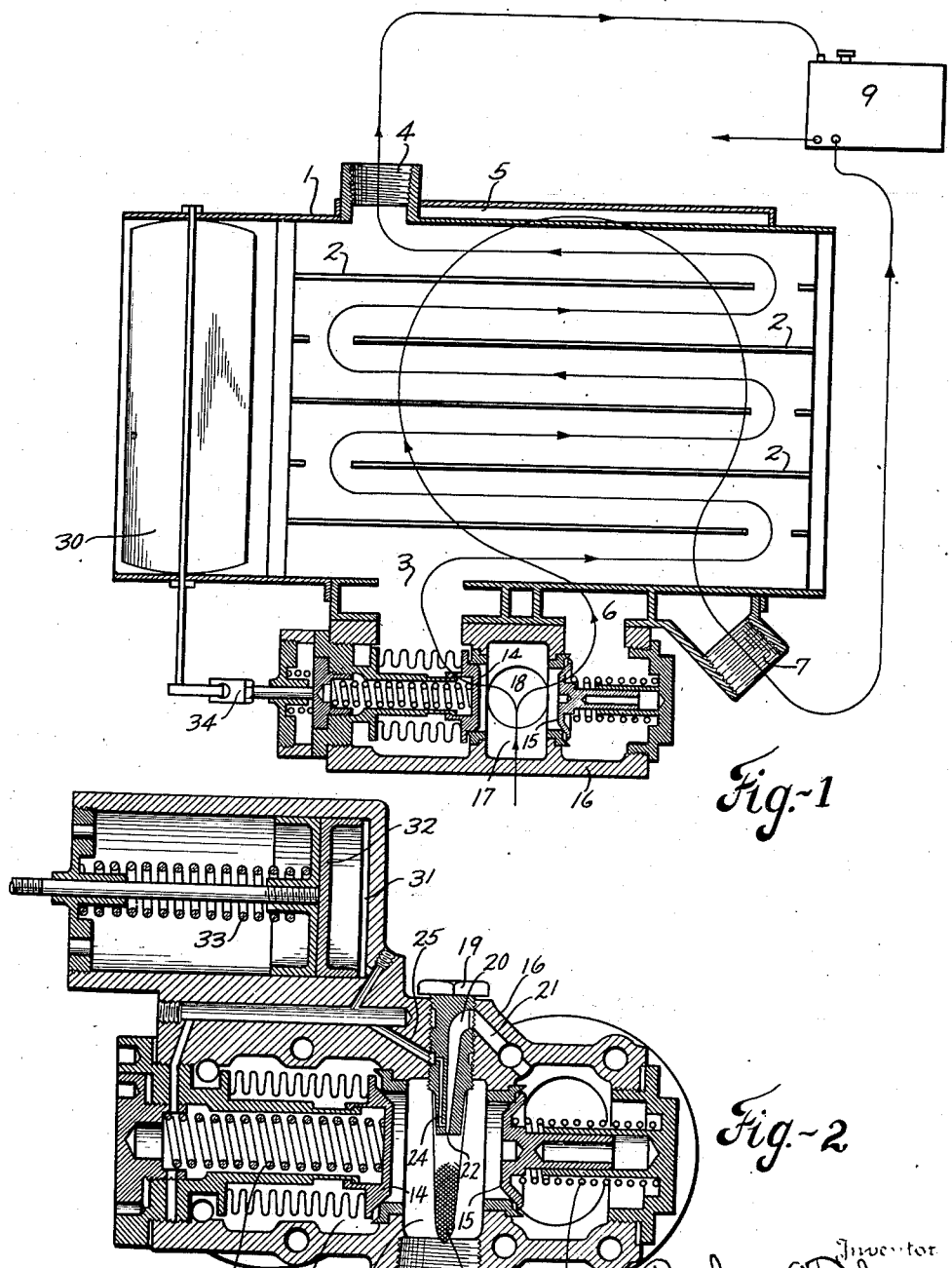

Nov. 10, 1942.    R. G. DYKEMAN ET AL    2,301,665
VISCOSITY-CONTROLLED REGULATOR
Filed May 19, 1938    2 Sheets-Sheet 2

Patented Nov. 10, 1942

2,301,665

UNITED STATES PATENT OFFICE 2,301,665

VISCOSITY-CONTROLLED REGULATOR

Reuben G. Dykeman and Joseph C. Shaw, Dayton, Ohio

Application May 19, 1938, Serial No. 208,769

17 Claims. (Cl. 184—104)

This invention pertains to viscosity controlled regulating or governing means wherein fluctuations of viscosity of a body of fluid is translated into motive force to effect various control or operating functions, and the mode of operation thereof.

For illustrative purposes, but with no intent to unduly limit the scope or application of the invention, it is herein shown and described as applied to a thermal fluid conditioning apparatus wherein the variations of thermal influence is automatically controlled in accordance with fluctuations of fluid viscosity, and the method of operation, the illustrative embodiment being a heat exchange unit for conditioning the lubricant supply of airplane, motor boat or racing automobile engines, whereby chilled or congealed oil initially is brought quickly to proper lubricating consistency and thereafter the temperature influence so controlled and balanced as to maintain the fluid lubricant in a predetermined condition of viscosity. It is to be understood, however, that the invention is not limited to such application but may be applied to various other purposes wherein automatic control of apparatus in accordance with condition of viscosity of a governing fluid is of prime importance.

The present disclosure is a further development and amplification of the apparatus and mode of operation forming the subject matter of copending application Serial No. 109,764, filed November 7, 1936, for Oil bypass device, to which cross reference is made.

The above mentioned application discloses means for automatically diverting the flow of lubricant or other fluid through either of two alternate courses, in one of which the heat absorbed while passing through the engine is utilized to thaw congealed lubricant within the heat exchange unit, whereupon the flow of lubricant is directed through the other of said courses wherein it is subject to the cooling influence of circulating air by which the heat is dissipated and the lubricant cooled. However, when flying at high altitudes and at great speed developed by modern airplanes, the air cooling influence may so far exceed that necessary to compensate for the heat absorbed by the lubricant during passage through the engine that the lubricant is cooled to too low degree and its viscosity again increased, whereas the full cooling capacity may be necessary at lower altitude and lesser speed. Therefore, in the present instance there is provided means for controlling the conditioning medium, whether air or other medium, in accordance with fluctuations of viscosity of the lubricant.

That is to say, whereas the former construction and mode of operation pertained primarily to the initial warming of the lubricant at the time of take-off, in order that the engine might be supplied as quickly as possible with lubricant of proper viscosity, the present invention pertains to regulation of the cooling influence to maintain the lubricant in a predetermined condition of viscosity while in flight or during the period of operation subsequent to that contemplated in the former invention.

The primary object of the invention is to utilize the fluctuations of viscosity of a fluid body to govern operation of an associated apparatus by translating such viscosity fluctuations into motive force to effect operating and control functions.

A further object of the invention is to provide a viscosity controlled regulating means for a heat exchange unit which is capable of being economically manufactured, which will be efficient in use, economical in operation, automatic in action, having relatively few operating parts and unlikely to get out of repair.

A further object of the invention is to provide viscosity controlled means for regulating the flow of a separate fluid body in accordance with fluctuations of viscosity of a governing fluid.

A further object of the invention is to provide viscosity controlled means for regulating thermal conditioning medium of a heat exchange unit.

A further object of the invention is to provide means for regulating the flow of one body of fluid in accordance with fluctuations of viscosity of a second body of fluid.

A further object of the invention is to regulate the flow of an air current in accordance with fluctuations of viscosity of a fluid body subject to the influence thereof.

A further object of the invention is to translate fluctuations of viscosity of a fluid body into motive force for performance of extraneous control or operating functions.

A further object of the invention is to provide means for automatically maintaining a body of fluid at substantially constant viscosity.

A further object of the invention is to provide a fluid thermostatic control apparatus having the advantageous features and meritorious characteristics herein mentioned.

A further object of the invention is to provide a device wherein there is created a pressure differential at a preselected point in the circulatory system intermediate the source of pressure and the oil temperature regulator, and wherein the back pressure resulting from the resistance to flow at that preselected point is utilized to control the viscosity of the oil.

With the above primary and other incidental objects in view as will more fully appear in the specification, the invention intended to be protected by Letters Patent consists of the features of construction, the parts and combinations thereof, and the mode of operation, or their equivalents, as hereinafter described or illustrated in the accompanying drawings.

In the drawings, wherein is illustrated the preferred but obviously not necessarily the only form of embodiment of the invention, Fig. 1 is a vertical sectional view of a heat exchange unit embodying viscosity controlled regulatory means.

Fig. 2 is a horizontal sectional view of the viscosity controlled governing mechanism shown in Fig. 1.

Like parts are indicated by similar characters of reference throughout the several views.

Figure 3:
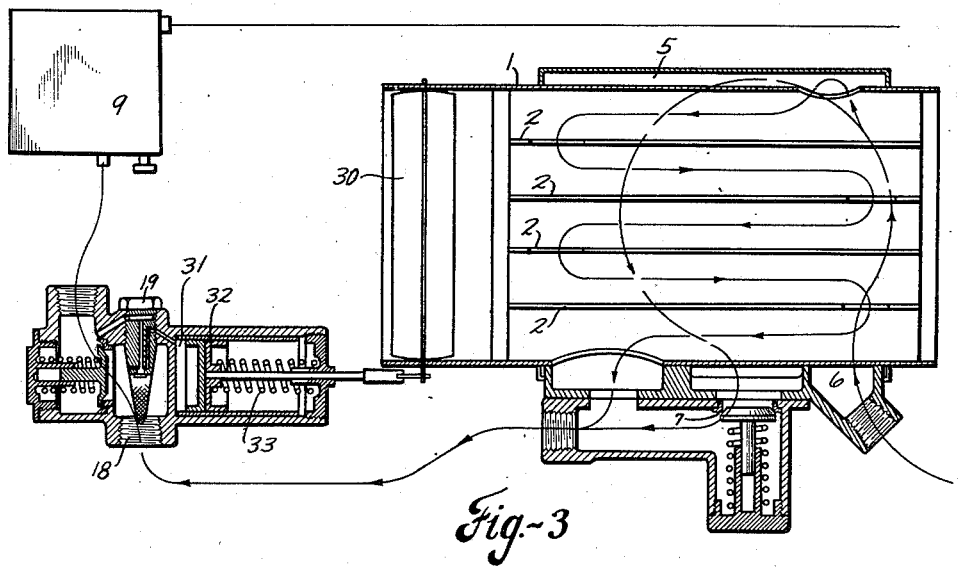
Fig. 3 illustrates a modified embodiment of the invention.
Figures 4, 5:
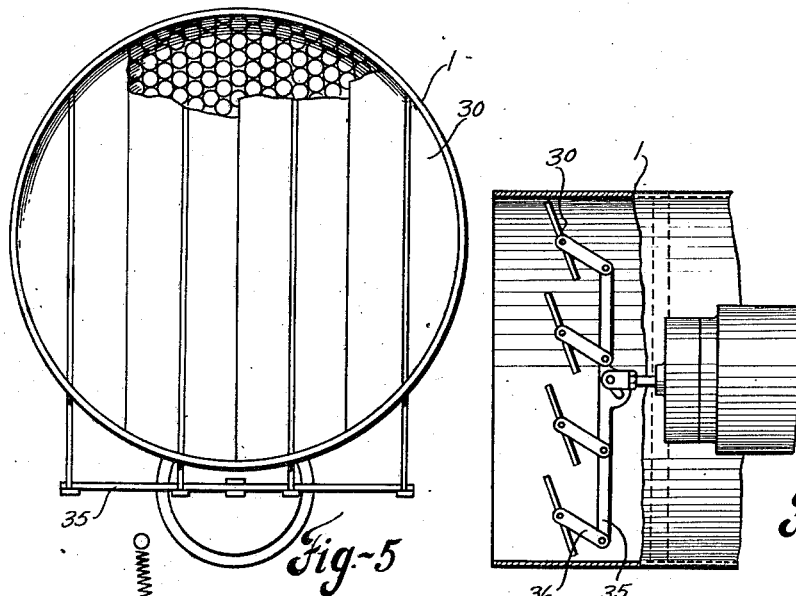
Fig. 4 is a detail sectional plan view of the shutter or damper means for the heat exchange unit controlled by fluctuations of viscosity of the governing fluid.
Fig. 5 is a front elevation of the heat exchange unit illustrating the regulatory shutters or dampers.
Figure 6:
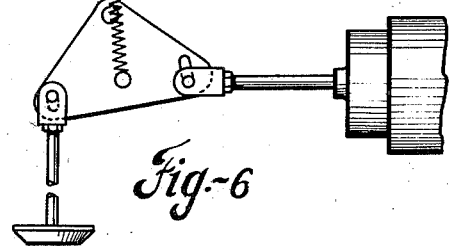
Fig. 6 is a fragmentary view showing the governing mechanism in the form of a valve control means.

While the invention is herein shown and described as applied to control of viscosity conditions of engine lubricant circulated through a heat exchange unit, it is to be understood that this is merely one application of the invention and that it is otherwise applicable to a wide variety of purposes. In lieu of adjusting the series of air control shutters or dampers herein shown, the same viscosity control means may be utilized to adjust a valve controlling circulation of a heating medium or a cooling or refrigerant medium as conditions may require.

Furthermore, although in the present instance the governing fluid is also the fluid to be conditioned, the invention contemplates use of a fluid subject to fluctuation of viscosity solely as a governing medium for regulating an associated apparatus, or for controlling the flow, thermal condition or other characteristics of a second fluid body, or for operating a valve, electric switch, mechanical or electrical heater means, controlling chemical reactions and various other applications, all within the purview of the invention and appended claims.

In the drawings 1 indicates a heat exchange unit which is preferably of the air-cooled radiator type having therein a series of baffles 2 defining a tortuous path through which fluid under pressure may flow from the intake 3 to the outlet 4. Surrounding the unit is a warming jacket 5, affording an alternative path through which the fluid may flow from the inlet 6 to the outlet 7. The construction and arrangement is such that if the fluid is highly viscous and congealed within the unit whereby the flow thereof is retarded, the flow of incoming fluid of lower viscosity and higher temperature is automatically directed through the warming jacket, until by transfer of heat the condition of the fluid within the unit is sufficiently modified to permit less restricted flow therethrough. The flowing warmed fluid is then subjected to cooling influence of air circulated through the radiator unit to maintain uniform temperature and predetermined viscosity of the fluid therein. The unit is connected into a fluid circulatory system wherein the fluid circulated through either passage of the unit is discharged to a suitable supply reservoir 9 from which it is delivered to an engine or other point of operation and returned thence for recirculation through one path or the other of the conditioning apparatus according to the viscosity of the fluid. The circulation of the fluid through its respective courses is controlled by a pair of fluid pressure operated valves 14 and 15 which respond respectively to viscosity conditions of the fluid being circulated. The valve 15 is a by-pass relief valve which serves to permit the incoming fluid under excess pressure to flow through the inlet 6 and thence through the warming jacket 5, whereby the congealed fluid in the main body of the radiator or heat exchange unit is thawed and thermally reconditioned to accelerate its flow therethrough. The valve 14 responds to lowered viscosity of the fluid to permit continued flow of the warmed fluid subsequent to its initial flow through the warming jacket, during which time the valve 15 remains closed.

The viscosity controlled unit as illustrated in Figs. 1 and 2 comprises a housing 16 having therein a fluid pressure chamber 17, provided at one side with a seat for the valve 14 and at the opposite side with a seat for the by-pass relief valve 15.

Fluid under pressure enters the pressure chamber 17 through the connection 18. Projecting into the pressure chamber 17 is a friction tube 19, sometimes known as a Venturi tube or metering tube, having therethrough a tapered bore 20 communicating with a passage 21 in the housing 16 through which the fluid under pressure may flow more or less freely in accordance with its condition of viscosity. The tube 19 has a restricted inlet orifice 22 through which the fluid is forced by pressure thereof within the chamber 17. The size and capacity of the inlet orifice 22 is proportioned to limit the flow to a predetermined maximum and the length and size of the Venturi or friction tube bore 20 is designed to provide the normal range of back pressure variation within the normal range or viscosity change of the fluid at the prevailing inlet pressure to the chamber 17.

To minimize possible clogging of the minute entrance orifice 22, a screen hood 23 encloses the open end of the friction or Venturi tube 19. Communicating with the tube passage 20 closely adjacent to the inlet orifice 22 is a branch duct 24 and continuing passage 25 in the housing 16 through which fluid under existing pressure within the tube passage 19 is admitted into an expansible and contractible chamber 26 behind the pressure operated outlet valve 14. The back pressure within the communicating branch conduits 24—25 equalizes with the back pressure within the Venturi or friction tube bore 20 created by resistance to flow of the fluid therethrough and fluctuates in unison therewith. Since a flow of liquid of high viscosity through the restricted passage 20 of the tube 19 under influence of pressure from the chamber 17 is resisted to a greater extent than flow of liquid of low viscosity therethrough, the pressure in the passages 24—25 and chamber 26 created by resistance to flow in the passages will increase or decrease as viscosity of the fluid increases or decreases.

The passages 20—21, leading from the chamber 17 to the area rearwardly of the valve 15 are subjected to pressure through the inlet orifice 22 in accordance with the prevailing pressure in the chamber 17. When the valve 15 is in closed position, the fluid flowing through the passages 20—21 is discharged from the outlet end of the passages at zero resistance, or substantially so, and there is thus effected a pressure differential between the inlet to and the outlet from the passages which is equal to the difference between the pressure in the chamber 17 and zero, or substantially zero pressure, at the outlet from the passages. However, when the valve 15 is open and fluid is flowing from the inlet chamber 17 past the valve 15 and around the jacket 5 of the heat exchange unit there is established a constant pressure differential across the inlet to and the outlet from the passages 20—21 which is equal to the pressure differential between chamber 17 and the area rearwardly of the valve 15 as established by a spring 27 and the particular shape of the valve seating and seat surfaces.

In operation, when the engine is started and the fluid pump begins to feed fluid under pressure to the chamber 17, the valve 14 opens due to the resistance of spring 26' being weaker than the spring 27 which resists opening movement of the valve 15, and the valve 15 remains closed. Fluid flow is then past the valve 14 through the inlet 3 and into the baffled interior of the heat exchange unit. Assuming the fluid to be cold, pressure is rapidly built up in the chamber 17 due to resistance to flow of the fluid through the tortuous interior path of the heat exchange unit. At the same time, flow of fluid through the passages 20—21 under pressure prevailing in the chamber 17 creates more or less back pressure and resistance to flow in accordance with the viscosity of the fluid. This back pressure, or static pressure, becomes effective in the chamber 26 through the passages 24—25, and augments the spring 26' in resisting opening movement of the valve 14. As this static pressure increases, the valve 14 is moved toward closed position which increases the pressure in the chamber 17, and when the combined closing effect of the static pressure and the spring 26' on the rearward face of the valve 14 becomes sufficiently strong and is greater than the resistance of the spring 27 to opening movement of the valve 15 the valve 14 closes and the valve 15 opens. It will be understood that such action of the valves and associated parts takes place within a relatively short space of time from the beginning of operation of the motor and the fluid pump. It will be further understood that the opening and closing movements of the valves 14 and 15 as just described take place gradually and not with a snap action.

When the valve 14 is closed and the valve 15 is open as just described, there will be a constant pressure differential between the inlet orifice 22 of the passages 20—21 and the outlet from such passages which is rearwardly of the valve 15. Under these conditions, the back pressure or static pressure effective in the chamber 26 through the passages 24—25 likewise varies in accordance with the viscosity of the fluid. Fluid flowing past the valve 15 will continue until the viscosity thereof reaches such a low point by reason of the fluid becoming heated that the resistance to flow of fluid through passages 20—21 is reduced to such an extent that the back or static pressure created by resistance to flow and effective on the rearward face of the valve 14 through chamber 26 is less than that which is necessary, in addition to the resistance of the spring 26', to hold the valve 14 closed in opposition to the resistance to opening movement of the valve 15 effected through the spring 27. Under such conditions the valve 15 closes and the valve 14 opens, the interior of the heat exchange unit having been warmed by flow of oil past the valve 15 and around the warming jacket 5. At this time flow will be through the interior of the heat exchange unit, and such flow will continue until for one reason or another the viscosity of the fluid increases to such an extent that the resistance to flow of fluid through the interior of the heat exchange unit will cause a pressure to be built up in the chamber 26 which, augmenting the spring 26', will become greater than the resistance to opening of the spring 27. Then, the valve 15 will open and the valve 14 will close and the cycle of operation hereinbefore described will be repeated.

The construction and operation thus described is substantially the same as that disclosed in the copending application for Letters Patent before referred to. In the present invention the back pressure developed in the cul-de-sac is utilized to open or close a valve of a separate circulatory system, operate an electric switch, actuate a starting or cut-off mechanism, or perform other functions than those pertaining directly to the circulatory system of the governing fluid per se as in the prior applications. The specific application in the present instance is for regulation of the air flow through the heat exchange unit 1 by automatic adjustment of a series of shutters 30 mounted contiguous to the heat exchange unit 1.

In the embodiment shown in Figs. 1 and 2 the back pressure passage or cul-de-sac conduit 25 is connected through a branch conduit with a pressure cylinder 31, having therein a reciprocatory piston 32 operable against the yielding resistance of a helical spring 33. As the back pressure within the conduits 25 and in the pressure cylinder 31 increases with increased viscosity of the fluid, the piston yields to the increased fluid pressure against the tension of the spring 33. This occurs as the fluid being circulated through the heat exchange unit 1 is cooled by the circulation of air. To reduce the air circulation through the radiator unit 1 the shutters 30 are closed to greater or less degree proportionate to such increase in the viscosity of the fluid. Such adjustment of the air control shutters 30 is effected by the afore-described movement of the piston 32. The stem of the piston is connected to a crank arm 34 having operative connection with a reciprocatory coupling bar 35 to which lever arms 36 carried by the shutters are in turn pivotally connected. Thus reciprocatory movement of the piston is transmitted to the coupling bar 35 by adjustment of which the shutters are adjusted in unison proportionately to the degree of movement of the piston. The piston is so connected to the shutters that outward movement of the piston against the resistance of its spring, which occurs under influence of increased back pressure incidental to cooling of the fluid and its increased viscosity, serves to proportionately close the shutters. This reduces the air circulation and its cooling effect. On the contrary, an increase of temperature of the governing fluid, with its consequent lowering of its viscosity, effects a reduction of back pressure within the pressure cylinder 31, thereby permitting return of the piston by the tensioned spring 33. As the piston returns, the shtuters are proportionately opened to permit increased air flow through the radiator or heat exchange unit to again cool the governing fluid and increase its viscosity. Thus the air circulation is varied in direct proportion to fluctuations of viscosity until a relatively balanced condition is achieved between the temperature of the governing fluid and its consequent viscosity and the supply of cooling air circulated through the unit. At higher altitudes and increased speeds whereby the cooling effect of the air is increased, the shutters are automatically proportionately closed to compensate for the changed conditions. On the contrary at lesser speeds and lower altitudes, the shutters are proportionately opened to compensate for loss of air cooling influence. The air cooling effect is thus automatically balanced under varying conditions with the viscosity of the governing fluid.

While the operations described pertain more particularly to airplane installation, for conditioning engine lubricant, it is to be understood that the heat exchange unit may be omitted and in lieu of engine lubricant circulated therethrough any fluid susceptible to viscosity change may be circulated through the unit 16 in a closed circuit by pump or other means, solely for governing purposes. In such event, the circulated governing fluid may be subjected to the temperature of a room to be air conditioned, and the shutters 15 in such case may control the entry to the room of either warm air from a heater or cool air from a refrigerating unit, or atmospheric air from outside the room. The operation and function would be the same.

It is also obvious that the piston stem may be connected to a valve operating means for opening or closing a valve controlling an entirely independent body of fluid in accordance with fluctuations of viscosity of the governing fluid, which in turn may or may not correspond to fluctuations of temperature. Likewise, the movement of the piston under variation of back pressure incident to fluctuation of viscosity may be utilized to open or close an electric switch for starting or stopping a fan, turning on or off a heater unit or refrigerating apparatus, or performing any one of numerous other functions.

In Fig. 3 there is shown an installation wherein the viscosity controlled device is separate from the heat exchange unit, but operatively connected to the air control shutters associated therewith. However, in this embodiment the pressure cylinder 31 has been assembled in the unit 16 in lieu of the pressure controlled valve 15, and is subjected to back pressure influence similarly to that which is effective on the rearward face of the valve 14, Figs. 1 and 2, through the cul-de-sac conduits 24 and 25.

Whereas various thermostatic apparatus has been before devised wherein the expansion and contraction of a body of fluid is utilized as the controlling factor, by the present invention the fluctuations of viscosity of the governing fluid is utilized for thermo control purposes. By the operation described, a balanced relation is established between the viscosity of the fluid and the thermal conditions to which the fluid is subjected and by which its viscosity is determined. As the fluid temperature rises and its viscosity decreases, more air or other cooling medium is admitted to compensate for the increased temperature of the fluid and the lower viscosity, and as the viscosity increases under influence of decreased temperature, the supply of air or cooling medium is automatically decreased until a balanced relation is attained.

From the above description it will be apparent that there is thus provided a device of the character described possessing the particular features of advantage before enumerated as desirable, but which obviously is susceptible of modification in its form, proportions, detail construction and arrangement of parts without departing from the principle involve or sacrificing any of its advantages.

While in order to comply with the statute, the invention has been described in language more or less specific as to structural features, it is to be understood that the invention is not limited to the specific features shown, but that the means and construction herein disclosed comprise the preferred form of several modes of putting the invention into effect, and the invention is therefore claimed in any of its forms or modifications within the legitimate and valid scope of the appended claims.

Having thus described our invention, we claim:

1. A heat exchange unit wherein lubricant is circulated under pressure and relative to which a current of air is directed for cooling the lubricant, means for creating a predetermined pressure drop in the lubricant being circulated under pressure, adjustable deflector means for the air current by adjustment of which the cooling effect of the air upon the lubricant is regulated, and a pressure operated device responsive to fluctuations of back pressure of the lubricant and resultant resistance to flow incident to changes of viscosity thereof at the point of predetermined pressure drop for automatically adjusting the air deflector means to maintain the viscosity of the lubricant substantially constant, said pressure operated device including a conduit through which fluid under pressure flows in proportion to the viscosity thereof, a pressure chamber communicating with the conduit in which lubricant back pressure is developed in proportion to flow of lubricant through said conduit and pressure operated means controlled by fluctuations of back pressure in the chamber.

2. An oil cooler through which engine lubricant is circulated and relative to which a current of air is directed for cooling the lubricant and thereby changing the viscosity thereof, an adjustable deflector for varying the effect of the air current upon the lubricant, a viscosity controlled unit including a tube having a restricted inlet orifice and an outlet, and through which tube the lubricant is discharged under pressure, means for maintaining a predetermined pressure differential across the restricted inlet orifice and the outlet of the tube, an expansible and contractible chamber communicating with the tube and subject to variations of back pressure created by resistance to flow of the lubricant in the tube incident to fluctuations of viscosity of the lubricant, and an operative connection between the expansible and contractible chamber and the adjustable air deflector for automatically adjusting the deflector in accordance with fluctuations of viscosity of the lubricant.

3. A heat exchange unit through which is circulated lubricant under pressure from an airplane engine and relative to which air is circulated incident to the travel of the airplane for cooling the lubricant, a shutter structure for regulating the cooling influence of the air upon the lubricant, and a viscosity controlled unit responsive to fluctuations of viscosity of the lubricant being circulated through the heat exchange unit and back pressure from the resulting resistance to flow for automatically adjusting the shutter structure in accordance with viscosity change of the lubricant to maintain the viscosity of the lubricant substantially constant, said viscosity controlled unit including a conduit through which lubricant under pressure flows in proportion to the viscosity thereof, a pressure chamber communicating with the conduit in which lubricant back pressure is developed in proportion to the flow of lubricant through said conduit, and pressure operated means controlled by the fluctuations of back pressure in the chamber.

4. An oil cooler through which engine lubricant is circulated under pressure, and wherein a cooling medium is circulated in relation thereto for cooling the oil and thereby changing the viscosity thereof, adjustable regulating means for the cooling medium by adjustment of which the cooling effect of the medium is varied to correspondingly vary the viscosity of the lubricant, and a viscosity controlled unit through which a portion only of the lubricant is passed including a pressure operated actuator for the cooling medium, and regulating means therefor governed by fluctuations of back pressure of the lubricant incident to changes of viscosity thereof and resultant variation in resistance to lubricant flow.

5. A heat exchange unit through which lubricant is circulated under pressure and relative to which air is circulated for cooling the circulated lubricant and changing the viscosity thereof, adjustable deflector means for varying the cooling influence of the air upon the circulated lubricant, a viscosity controlled unit including a tube having a restricted orifice through which a portion only of the lubricant is passed, a pressure actuator for the adjustable air deflector communicating with the tube and governed by fluctuations of back pressure within the tube incidental to fluctuations of viscosity and resultant resistance to flow of the fluid passing therethrough.

6. In a viscosity controlled apparatus a circulatory system through which a viscous governing fluid is circulated under pressure, thermal conditioning means for the governing fluid for varying the viscosity thereof, adjustable thermal control means therefor, and a viscosity controlled unit subject to fluctuations of viscosity and resultant resistance to flow of the governing fluid effective to actuate the adjustable thermal control means in accordance with such fluctuations of back pressure of the governing fluid induced by changes of viscosity thereof and resultant resistance to flow, said viscosity controlled unit including a conduit through which fluid under pressure flows in proportion to the viscosity thereof, a pressure chamber communicating with the conduit in which lubricant back pressure is developed in proportion to the flow of lubricant through said conduit, and pressure operated means controlled by the fluctuations of back pressure in the chamber.

7. A pressure circulatory system for a viscous governing fluid wherein the fluid is subjected to thermal conditioning influence by which its viscosity is changed, thermal conditioning control means, a viscosity controlled unit subject to influence of changes of viscosity of the governing fluid, including a governor for the thermal conditioning control means subject to influence of fluctuations of back pressure of the governing fluid induced by changes of viscosity thereof and the resultant resistance to flow, said governor including a friction tube and a restricted orifice through which the fluid flows more or less freely in accordance with varying viscosity thereof, a branch conduit communicating with the friction tube through which varying fluid back pressure is exerted in proportion to the viscosity of the fluid flowing through the friction tube, and pressure operated means controlled by the fluctuations of back pressure through the branch conduit.

8. A heat exchange unit wherein lubricant is circulated under pressure and relative to which a current of air is directed for cooling the lubricant, lubricant flow pressure equalizing means, adjustable deflector means for the air current by adjustment of which the cooling effect of the air upon the lubricant is regulated, and a viscosity controlled unit including a pressure operated device responsive to fluctuations of back pressure of the lubricant incident to changes of viscosity and resultant resistance to flow thereof for automatically adjusting the air deflector means to maintain the viscosity of the lubricant substantially constant.

9. A heat exchange unit through which is circulated a viscous fluid to be thermally conditioned, and relative to which a current of air is circulated for thermally conditioning the circulated viscous fluid, adjustable shutter means regulating the circulation of air relative to the heat exchange unit, a viscosity controlled unit automatically adjusting said shutter means in accordance with fluctuations of viscosity and resultant resistance to flow of the viscous fluid being conditioned, said viscosity controlled unit including a tube through which the viscous fluid flows under pressure, a restricted inlet orifice thereto, and a cul-de-sac communicating with the tube intermediate the restricted inlet orifice and the outlet from such tube, in which back pressure is developed proportionately to the pressure of the liquid flowing through the tube, pressure operated means controlled by the fluctuations of back pressure in the cul-de-sac in accordance with variations of viscosity of the liquid, and an operative connection between the pressure operated means and the shutter means.

10. A heat exchange unit wherein a viscous fluid is thermally conditioned by circulation of a conditioning fluid relative thereto, regulating means for the conditioning fluid, and a viscosity controlled unit automatically adjusting said regulating means in accordance with fluctuations of viscosity and resultant resistance to flow of the viscous fluid being conditioned, said viscosity controlled unit including a tube through which the viscous fluid flows under pressure, a restricted inlet orifice thereto, and a cul-de-sac communicating with the tube intermediate the restricted inlet orifice and the outlet from such tube, in which back pressure is developed proporionately to the pressure of the liquid flowing through the tube, and pressure operated means controlled by the fluctuation of back pressure in the cul-de-sac in accordance with variations of viscosity of the liquid.

11. A circulatory system for a viscous governing fluid, a thermal conditioning means for the governing fluid by which the viscosity thereof may be varied, and control means for said thermal conditioning means regulated by fluctuations of viscosity of the governing fluid incident to changes of viscosity and resistance to flow thereof, said control means including a tube through which the viscous fluid flows under pressure, a restricted inlet orifice thereto, and a cul-de-sac communicating with the tube intermediate the restricted inlet orifice and the outlet from such tube, in which back pressure is developed proportionately to the pressure of the liquid flowing through the tube, and pressure operated means controlled by the fluctuation of back pressure in the cul-de-sac in accordance with variations of viscosity of the liquid.

12. A viscosity controlled apparatus including a chamber to which governing fluid subject to fluctuation of viscosity is supplied under pressure, a tube communicating with the chamber having a passage therethrough and a restricted orifice for flow of the governing fluid, a cul-de-sac communicating with the passage intermediate the orifice and the discharge outlet from said tube in which back pressure is developed proportionate to the pressure of the fluid flowing through the tube, and an associated device controlled by fluctuations of back pressure incident to changes of viscosity of the governing fluid.

13. The herein described method which includes circulating viscous fluid under pressure relative to a conditioning medium whereby the viscosity of the fluid is changed, and utilizing the fluctuations of back pressure of the fluid incident to changes of viscosity and resultant resistance to flow thereof for varying the effect of the conditioning medium relative to which the fluid is circulated.

14. The herein described method including relatively circulating body of viscous fluid under pressure and a fluid conditioning medium whereby the viscosity of the viscous fluid is changed, and utilizing the fluctuations of back pressure of the viscous fluid incident to changes of viscosity and resultant resistance to flow thereof for controlling the flow of the fluid conditioning medium.

15. A circulatory system for a viscous governing fluid wherein the fluid is subjected to thermal conditioning influence by which its viscosity is changed, a viscosity controlled unit subject to changes of viscosity of the governing fluid, an associated device to be actuated, and pressure operating means therefor energized by fluctuations of back pressure of the governing fluid induced by changes of viscosity and resultant resistance to flow, said pressure operating means including a conduit through which fluid under pressure flows in proportion to the viscosity thereof, a pressure chamber communicating with the conduit in which lubricant back pressure is developed in proportion to the flow of lubricant through said conduit, and pressure operated means controlled by the fluctuations of back pressure in the chamber.

16. A circulatory system for a viscous fluid under pressure wherein the fluid is subject to change of viscosity, a member exteriorly of the circulatory system to be actuated in accordance with changes of viscosity of the fluid, a viscosity controlled unit subject to influence of fluctuations of viscosity of the fluid including a pressure actuator for said member controlled by fluctuations of back pressure of the fluid induced by changes of viscosity and resultant resistance to flow, a conduit through which fluid under pressure flows in proportion to the viscosity thereof, and a pressure chamber in which the pressure actuator is disposed communicating with the conduit and in which lubricant back pressure is developed in proportion to the flow of lubricant through such conduit.

17. A circulatory system for a viscous fluid under pressure wherein the fluid is subject to change of viscosity, a variable thermal conditioning means for the fluid by which its viscosity is changed, a viscosity controlled unit subject to influence of viscosity changes of the fluid including a pressure actuated regulator for the thermal conditioning means controlled by fluctuations of back pressure of the fluid induced by changes of viscosity and resultant resistance to flow, a conduit through which fluid under pressure flows in proportion to the viscosity thereof, and a chamber in which the pressure actuated regulator is disposed communicating with the conduit and in which lubricant back pressure is developed in proportion to the flow of lubricant through such conduit.

REUBEN G. DYKEMAN.
JOSEPH C. SHAW.